April 22, 1952 L. J. MAHLMEISTER 2,594,046
GAUGING DEVICE FOR CHECKING AXIS RELATIONSHIP
Filed Sept. 26, 1946
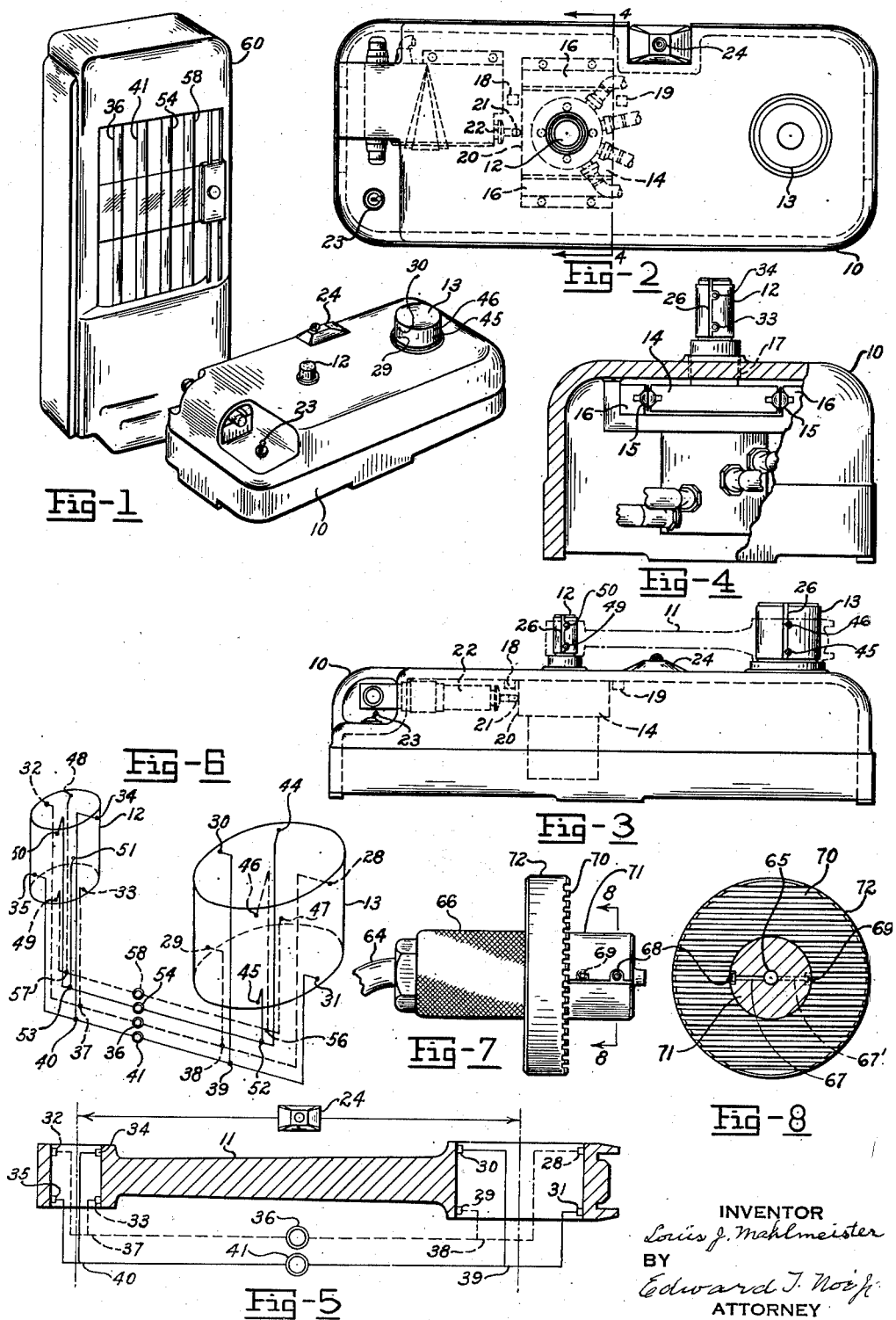
INVENTOR
Louis J. Mahlmeister
BY
Edward J. Noif
ATTORNEY Patented Apr. 22, 1952

2,594,046

UNITED STATES PATENT OFFICE 2,594,046

GAUGING DEVICE FOR CHECKING AXIS RELATIONSHIP

Louis J. Mahlmeister, Dayton, Ohio, assignor to The Sheffield Corporation, Dayton, Ohio, a corporation of Ohio Application September 26, 1946, Serial No. 699,554

15 Claims. (Cl. 73—37.5)

This invention relates to gauging apparatus and more particularly to gauging apparatus for measing or comparing relationship of the axis of a hole or of a projection of a part with another surface of the part.

One object of the invention is the provision of a gauging apparatus for determining the relationship of the axis of a surface of a part to another surface of the part and of such construction and arrangement as to provide convenient and accurate indication of any angular displacement of the axis from a normal or desired position.

Another object is the provision of a gauging apparatus of the character mentioned in which a pair of conjointly acting gauging nozzles are provided for cooperative association with opposite sides of the surface of the part to be checked or gauged, and at axially offset locations, the two gauging nozzles being connected to a common flow indicating gauge to show deviations of the axis of the surface gauged from a normal or desired position.

Another object is the provision of a gauging apparatus especially adapted to check or gauge the angular relation of the axis of a part surface with respect to an end face of the part.

Another object is the provision of a gauging apparatus especially adapted for gauging the angle relation of the axes of two spaced areas of a part and including means having axially displaced transversely opposed gauging members arranged in pairs adapted for cooperative association with two surfaces of the part and means for comparing the cumulative or cooperative effect of one group of the gauging members with another group.

Other objects and advantages of the invention will be apparent from the following description, the appended claims and the accompanying drawing, in which, Fig. 1 is a perspective view of a gauging apparatus embodying the present invention;

Fig. 2 is a top plan view of the work carrier;

Fig. 3 is a side elevation showing the work carrier;

Fig. 4 is a vertical section on the line 4—4 of Fig. 2;

Fig. 5 is a view showing a workpiece and diagrammatically indicating the connections between the gauging members and flow measuring gauges, in one geometric plane;

Fig. 6 is a diagrammatic showing of the fluid connections to the various gauging members in different geometric planes;

Fig. 7 is a side elevation of a modified form of construction adapted to check the angle relationship between the axis of an area, and an end face; and Fig. 8 is a section on the line 8—8 of Fig. 7.

In the drawing the same reference numerals have been used to designate like parts in the different views.

Referring to Figs. 1 to 6, which show one adaptation of the invention as an apparatus for checking the axis parallelism of two spaced areas of a part to be gauged, 10 generally designates the housing of a workholder. While the work holder may be provided with either male or female work engaging surfaces depending upon whether holes or projections are to be gauged on the part, the apparatus as herein shown for exemplary purposes is arranged for gauging the relationship of the axes of holes in a part or workpiece 11, and the part 11 takes the form of a connecting rod. Since the apparatus is for checking two holes in the work, the work carrier is provided with two spaced cylindrical surfaces or plugs 12 and 13 the axes of which are parallel to one another and the diameters of each are slightly less than the respective holes in the part to be gauged. These plugs are adapted to interfit the holes in the part, the term "interfitting" being used to denote an engagement of the master or reference surfaces with the areas of the part to be gauged irrespective of whether the master surfaces are of a male or female form. The plug 13 has a fixed position with respect to the carrier or work holder 10, and preferably the plug 12 is fixed on a slide plate 14 which is slidably mounted, preferably by anti-friction bearing members 15 in guide bars 16 fixed on the carrier so that the plug 12 can move transversely of its own axis towards and from the stationary plug 13.

The transverse movement of the plug 12 is quite limited, the hole 17 in the upper wall of the carrier 10 being only slightly larger in diameter than the projecting portion of the plug. Stops 18 and 19 fixed on the under side of the top wall of the carrier limit the motion of the slide 14. Engaging the end 20 of the slide is a gauging plunger 21 of a gauge 22 which is responsive to movements of the slide 14. When the connecting rod is applied to the two plugs 12 and 13 it adjusts the position of the plug 12 towards the left as viewed in Fig. 3 and against the spring pressed plunger 21 of gauge 22, the gauge 22 showing any deviation from a required tolerance in the spacing of the axes of the holes in the connecting rod. Thus the axis of the plug 13 has a definite fixed or predetermined angle relationship with respect to the axis of the plug 12 although the distance between the two plugs may change. The gauge 22 may be of the character disclosed in Patent 2,254,313. The supply of electric current to the gauge 22 may be controlled by the "On and Off" switch 23, while the indicating lamp associated with the gauge 22 is shown at 24.

The plugs 12 and 13 are provided with a number of pairs of axially offset transversely opposed gauging members forming sets in which the members of a set are connected to a common indicating means which gives the cumulative or cooperative effect of the various members of the set. While the gauging members may take other forms, they are preferably, as herein illustrated, gauging nozzles connected to a supply of air or other fluid under constant pressure, the amount of leakage taking place between the end of the nozzles and the surfaces of the workpiece or part to be gauged being determined by the size of the areas of the part. Each of these gauging nozzles is arranged so that its gauging face is slightly depressed from the cylinder defining the surface of the plug so that a slight clearance exists between the surface of the gauging nozzle and the work even if the area on the work fits closely around the plug, air leakage taking place along the grooves 26 in the plugs.

As shown more particularly in Figs. 1, 5 and 6, the plug 13 has a pair of gauging nozzles 28 and 29 which are transversely opposed to one another but axially offset. A second pair of nozzles 30 and 31 is also provided in the plug 13 and these nozzles are also transversely opposed and axially offset, the individual members of this second pair being directly opposed to the nozzles of the first pair. The plug 12 has a pair of axially offset transversely opposed gauging nozzles 32 and 33 and a second pair 34 and 35. All of the nozzles 28 to 35 are arranged in a common geometric plane containing hte axes of the plugs 12 and 13, the nozzles 28, 29, 32 and 33 forming a set or group, being cooperatively associated with a common flow gauge 36. This flow gauge may be of the character disclosed in Patent 2,254,259 which shows an upwardly tapered flow tube having an indicator responsive to the flow taking place through the gauging nozzles. The upper or discharge end of the flow tube is connected through branch passages 37 and 38 (see Fig. 5) to all of the nozzles 28, 29, 32 and 33 so that the cumulative effect of the leakage through all of these nozzles will be shown. It should be particularly noted that the two nozzles 29 and 33 which cooperate with the lower portion of the connecting rod on the adjacent portions of the two holes are connected in the same set or group with the gauging nozzles that cooperate with the upper remote portions of the two areas to be gauged.

The two sets of gauging nozzles 30, 31 and 34, 35, constitute a second group, all of these four nozzles being connected through branch passages 39 and 40 to a second flow tube 41.

The two groups of gauging nozzles connected to the two flow tubes 36 and 41 determine any non-parallel relation of the axes of the holes in the connecting rod insofar as concerns the plane that contains both of these axes or in other words in the plane of the drawing, and this is accomplished by first adjusting the apparatus by a connecting rod or master in which its holes are exactly parallel to one another. With the master in place, the level of the floats or indicators in the two flow tubes 36 and 41 is made the same as by suitable pressure adjustments. Then the master is removed and the workpiece to be gauged is applied to the plugs 12 and 13. With the balanced arrangement of the groups of gauging members or nozzles, the two floats or indicators will be opposite one another if the hole axes are parallel, regardless of the actual diameters of the holes and regardless of hole taper. If the hole axes are parallel in the workpiece being gauged, the level of the indicators of the two flow tubes 36 and 41 will be the same, although both indicators may be somewhat higher or lower in the tubes than when the master was applied if the diameters of the holes or the diameter of one of the holes of the part being gauged is greater or less than the hole in the master. If the axes of the holes in the workpiece being gauged are not exactly parallel in the plane of the drawing, and assuming that the axis of the hole gauged by the plug 13 is displaced counterclockwise as viewed in Fig. 5, then considerably more air will flow through the increased clearance between the gauging nozzles 30 and 31 as compared with the flow through the gauging nozzles 28 and 29, and the difference in the levels of the floats of the tubes 36 and 41 will be apparent, showing this out-of-parallelism of the hole axes. If the hole axes are parallel, it makes no difference whether the holes are tapered slightly or whether they are slightly larger or smaller than the master, since the balanced arrangement of pairs of nozzles arranged in groups gives automatic compensation for any of these conditions and produces an indication on the two indicators so that one is the same as the other as long as proper parallelism exists in the hole axes.

The two groups or sets of nozzles so far described operate conjointly to show a non-parallel condition of the axes in the plane of the drawing, and for checking exact parallelisms of the axes in space, additional groups of gauging nozzles are provided in planes extending transversely of the geometric plane containing the axes of the holes. Thus as shown in Fig. 6, the plug 13 is provided with a pair of transversely opposed axially offset nozzles 44 and 45, and with a second set 46 and 47. The plug 12 has a set of nozzles 48 and 49 and a second set 50 and 51. The nozzles 44, 45, 50 and 51 form one group or set, being connected through parallel branch passages 52 and 53 to a flow tube 54. The nozzles 46, 47, 48 and 49 form the other set, being connected through the branch passages 56 and 57 to a flow tube 58.

The several flow tubes are arranged adjacent one another in a common housing or support 60 so that means are thus provided for comparing the cumulative effect or coordinated action of any set with any of the other sets. With the levels of the floats or indicators in the several tubes the same when the master or connecting rod having holes exactly parallel is supplied, any non-parallel condition of the hole axes in the part gauged will be apparent by displacement of one of the indicators with respect to the level of the other indicators.

In the embodiment of the invention that has been described the axis of one of the holes or areas of the part can be compared to a reference surface which in that case is the surface of the other hole, but the invention is susceptible in certain of its aspects to the gauging of an axis of hole or post of a workpiece with respect to another surface of the workpiece such as an end face adjacent the hole or post. Thus Figs. 7 and 8 show a gauging member which in this case is a portable device having a fluid supply connection 64 extending from a hole 65 in the handle 66 to the upper end of a flow measuring tube such as the tube 36 shown in Fig. 1. Air supplied from a constant pressure source through the flow measuring tube 36 and through the hole 65 and its branch passages 67 and 67' is discharged through two laterally opposed axially offset gauging nozzles 68 and 69 which cooperate with the opposite sides of a hole in the workpiece. The end face of the workpiece is held firmly against a reference surface 70 which is exactly at right angles to the axis of the plug portion 71 which interfits with the hole in the part to be gauged. The nozzles are arranged in this plug, the reference surface being formed on the flange 72 which is rigid with the handle 66 and with the plug 71. If the level of the float doesn't change while the operator rotates the workpiece with respect to the plug, or rotates the plug with respect to the workpiece, the operator will know that the axis of the hole is exactly at right angles to the plane of the end face. If there is a variation in the float level during this relative rotation of the workpiece and the gauging member it will be because of a misplacement of the axis of the hole. This would allow more flow to both nozzles and then less flow through both nozzles during the slow rotational movement. This will be true regardless of a slightly tapered condition of the hole being gauged.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Gauging apparatus for measuring or comparing the relationship of the axis of a cylindrical area of a part to another area of the part comprising a member having a cylindrical plug adapted for interfitting engagement with the cylindrical area of the part and having a reference surface adapted for engagement with said other area of the part, the reference surface having a definite predetermined relationship to the axis of said plug, said plug having a number of transversely opposed axially offset gauging nozzles for cooperation with opposite sides of said cylindrical area of the part, a flow measuring gauge, and a fluid connection from said flow measuring gauge to said nozzles.

2. Gauging apparatus for measuring or comparing the relationship of the axis of a cylindrical area of a part to the plane of an end face of the part, comprising a member having a cylindrical plug adapted for interfitting engagement with the cylindrical area of the part and having a flat reference surface adapted for engagement with the end face of the part, said reference surface having a definite predetermined relationship to the axis of said plug, said plug having a number of transversely opposed axially offset gauging nozzles for cooperation with opposite sides of said cylindrical area of the part at axially displaced locations thereon, a flow measuring gauge, and a fluid connection from said flow measuring gauge to said nozzles.

3. Gauging apparatus for measuring or comparing the axis parallelism of two spaced cylindrical areas of a part, comprising a work carrier having two spaced carrier portions provided with surfaces adapted for loose interfitting engagement with the respective areas of the part, said portions being provided with a plurality of sets of pairs of gauging nozzles and each pair of gauging nozzles comprising two axially offset transversely opposed nozzles adapted for cooperation with opposite sides of an area of the workpiece to control the amount of leakage of fluid supplied to the nozzles in accordance with the spacing between the nozzles and the workpiece area, and means having connections to said nozzles for comparing the cumulative leakage effect of a set of said gauging nozzles with the cumulative leakage effect of another of said sets to show deviation of axis parallelism of the areas of the part.

4. Gauging apparatus for measuring or comparing the axis parallelism of two spaced cylindrical areas of a part, comprising a carrier having two spaced cylindrical surfaces adapted for loose interfitting engagement with the respective areas of the part, each of said surfaces being provided with a pair of diametrically opposed axially offset gauging nozzles each adapted to receive fluid under pressure and to cooperate with an area of the part to control the leakage of such fluid for gauging the spacing between the part area and the carrier surface at the nozzle location, with the said two pairs of nozzles forming a set, said surfaces being provided with a second set of two pairs of diametrically opposed axially offset gauging nozzles, each gauging nozzle of the second set being located directly opposite a nozzle of the first set, means connected to said nozzles of the first set for coordinating the gauging action of all the nozzles of the first set, and means connected to the nozzles of the second set for coordinating the gauging action of all the nozzles of the second set.

5. Gauging apparatus for measuring or comparing the axis parallelism of two spaced cylindrical areas of a part, comprising a carrier having two spaced cylindrical surfaces with parallel axis and adapted for loose interfitting engagement with respective areas of the part, each of said surfaces being provided with four pairs of gauging nozzles arranged in two transverse planes with the gauging nozzles of each pair located in diametrically opposed axially offset relationship, each of said nozzles comprising a passage for receiving fluid under pressure and the discharge surface facing towards and cooperating with an area of the part to control the leakage through the passage, four fluid operated gauging devices each having an indicating means responsive to fluid flow, fluid connections one extending from each of said fluid operated gauging devices to a pair of gauging nozzles of one surface and a pair of the gauging nozzles of the other surface so that differences of indications of the four indicating means show axial displacements of the areas of the part in different planes.

6. Gauging apparatus for measuring or comparing axis parallelism and spacing of two spaced areas of a part, comprising a carrier having a stationary portion and a movable portion movable towards and from the stationary portion, indicating means operable in accordance with the movement of said movable portion, said stationary and movable portions being adapted for loose interfitting engagement with the respective areas of the part, each of said portions being provided with a pair of diametrically opposed axially offset gauging nozzles for receiving fluid under pressure and each adapted to be controlled in accordance with its spacing from an area of the part to determine the amount of fluid flow therethrough, said two pairs forming a set, said portions also having a second set of gauging nozzles which also comprise pairs of transversely opposed axially offset gauging nozzles, and means including connections to said nozzles for comparing the cumulative effect of one set of gauging nozzles with the cumulative effect of the other set.

7. Gauging apparatus for measuring or comparing axis parallelism of two spaced cylindrical areas of a part, comprising a carrier having two spaced cylindrical surfaces adapted for loose interfitting engagement with the respective areas of the part, each of said surfaces being provided with a pair of diametrically opposed axially offset gauging nozzles each for gauging the spacing between the part area and the carrier surface at the nozzle location by controlling the amount of leakage of fluid supplied to said nozzle, with said two pairs of nozzles forming a set, said surfaces having a second set of two pairs of diametrically opposed axially offset gauging nozzles, each gauging nozzle of the second set being located opposite a nozzle of the first set, the nozzles of the first and second sets being located in a common geometric plane, third and fourth sets of gauging nozzles located on said surfaces in planes transverse of said common plane, means connected to the nozzles of the first set for coordinating the gauging action of all the nozzles of the first set, means connected to the nozzles of the second set for coordinating the gauging action of all the nozzles of the second set, means connected to the nozzles of the third set for coordinating the gauging action of all the nozzles of the third set, and means connected to the nozzles of the fourth set for coordinating the gauging of all the nozzles of the fourth set.

8. Gauging apparatus for measuring or comparing the relationship of the axes of two spaced areas of a part, comprising a pair of transversely opposed axially offset gauging members for the first of said areas, a second pair of transversely opposed axially offset gauging members for the second of said areas, said two pairs forming a set, a third pair of transversely opposed axially offset gauging members for the first said area, a fourth pair of transversely opposed axially offset gauging members for the second of said areas, said third and fourth pairs forming a second set, a carrier having two spaced carrier portions provided with surfaces adapted for loose interfitting engagement with the respective areas of the part and supporting said gauging members in positions such that the gauging members of the first pair are each directly opposite a gauging member of the third pair on one of said carrier portions, and so that the gauging members of the second pair are each directly opposite a gauging member of the fourth pair on the other of said carrier portions and such that the gauging members are arranged for gauging association with the respective areas and are controlled by said areas, and responsive means having connections to said gauging members for comparing the cumulative effect of one set of gauging members with the cumulative effect of the other set.

9. Gauging apparatus as set forth in claim 8 in which all of the gauging members are arranged in a common geometric plane.

10. Gauging apparatus as set forth in claim 8 in which the gauging members of the first and third pairs are arranged in a plane which is parallel to a different plane containing the gauging members of the second and fourth pairs.

11. Gauging apparatus as set forth in claim 8 in which said gauging members are flow controlling nozzles which cooperate with an area of a part to determine the amount of leakage of fluid supplied to the nozzles and in which the responsive means comprises flow gauging indicators each connected to one of the sets of gauging members.

12. Gauging apparatus for measuring or comparing the relationship of the axes of two spaced areas of a part, comprising a pair of transversely opposed axially offset gauging members for the first of said areas, a second pair of transversely opposed axially offset gauging members for the second of said areas, said two pairs forming a set, a third pair of transversely opposed axially offset gauging members for the first said area, a fourth pair of transversely opposed axially offset gauging members for the second of said areas, said third and fourth pairs forming a second set, a carrier having two spaced carrier portions provided with surfaces adapted for loose interfitting engagement with the respective areas of the part and supporting said gauging members in positions such that the gauging members of the first pair are each directly opposite a gauging member of the third pair on one of said carrier portions and so that the gauging members of the second pair are each directly opposite a gauging member of the fourth pair on the other of said carrier portions and such that the gauging members are arranged for gauging association with the respective areas and are controlled by said areas, the gauging members of the first and second sets being located in a common geometric plane, third and fourth sets of pairs of axially offset gauging members located on said carrier portions in two parallel planes transverse of said common plane so that the gauging members of the third set are each directly opposite a gauging member of the fourth set and arranged for gauging association with the respective areas, and means having connections to said sets of gauging members for comparing the cumulative effect of any set of gauging members with the cumulative effect of any of the other sets.

13. Gauging apparatus for measuring or comparing the relationship of the axes of two spaced areas of a part comprising a carrier having a stationary portion adapted for interfitting engagement with one of the areas of the part and having a relatively movable portion adapted for interfitting engagement with the other said area, means for guiding the movable portion on the stationary portion to vary the spacing between said portions and maintain a parallel relation with said portions, means responsive to changes of position of said movable portion, a pair of transversely opposed axially offset gauging nozzles for the first of said areas, a second pair of transversely opposed axially offset gauging nozzles for the second of said areas said two pairs forming a set, a third pair of transversely opposed axially offset gauging nozzles for the first of said areas and a fourth pair of transversely opposed axially offset gauging nozzles for the second of said areas said third and fourth pairs forming a second set, said carrier providing said first and third pairs on said stationary portion and providing said second and fourth pairs on said movable portion for gauging association with the areas of the part and with the gauging nozzles of one set each directly opposite a gauging nozzle of the second set, a flow gauging device connected to all the nozzles of one set, and a flow gauging device connected to all the nozzles of the second set.

14. Gauging apparatus for measuring or comparing the relationship of the axes of two spaced areas of a part, comprising a pair of transversely opposed axially offset gauging nozzles for the first of said areas, a second pair of transversely opposed axially offset gauging nozzles for the second of said areas, a carrier having spaced portions adapted for interfitting engagement with said areas and on which said gauging nozzles are provided in positions such that the gauging nozzles are arranged for gauging association with the respective areas and are controlled by said areas to vary the amount of leakage of fluid supplied thereto in accordance with the positions of the nozzles with respect to the adjacent portions of said areas, and a flow gauging device connected to all of said nozzles.

15. Gauging apparatus for measuring or comparing the relationship of the axis of a cylindrical area of a part to another area of the part comprising a member having a portion adapted for interfitting engagement with the cylindrical area of the part and also having a reference surface adapted for engagement with said other area of the part, the reference surface having a definite predetermined relationship to the axis of said member, said member having a number of transversely opposed axially offset gauging nozzles for cooperation with opposite sides of said cylindrical area of the part at axially displaced locations thereon, a flow measuring gauge, and a flow connection from said flow measuring gauge to said nozzles.

LOUIS J. MAHLMEISTER.

REFERENCES CITED

The following references are of record in the file of this patent:

UNITED STATES PATENTS

| Number | Name | Date |
| --- | --- | --- |
| 2,318,709 | Persson | May 11, 1943 |
| 2,346,406 | Wright | Apr. 11, 1944 |
| 2,431,014 | Aller | Nov. 18, 1947 |
| 2,431,087 | Subber | Nov. 18, 1947 |